United States Patent

Solomon

[15] 3,638,788

[45] Feb. 1, 1972

[54] CASSETTE COVER

[72] Inventor: Nathan L. Solomon, P.O. Box 550, Englewood, N.J. 07631

[22] Filed: Oct. 9, 1969

[21] Appl. No.: 865,125

[52] U.S. Cl. ............................................206/52 R, 220/60 R

[51] Int. Cl. ....................................B65d 85/67, B65h 55/00

[58] Field of Search ..................206/52 F, 52 R, 59 E, 62 PR, 206/1; 220/60; 229/52 BC

[56] References Cited

UNITED STATES PATENTS

| | | | |
|---|---|---|---|
| 2,181,808 | 11/1939 | Goldsmith | 206/52 R |
| 2,441,134 | 5/1948 | Brogden | 229/52 BC |
| 3,272,325 | 9/1966 | Schoenmakers | 206/52 F |
| 3,381,810 | 5/1968 | Lasher et al | 206/52 R |
| 3,394,838 | 7/1968 | Larkin | 220/60 R |

*Primary Examiner*—William T. Dixson, Jr.
*Attorney*—Howard C. Miskin

[57] ABSTRACT

A sheet of material which can be bent to enclose a tape cassette, engaging means coupled to the material, and, if desired, positioned to pass through the centers of the tape spools of the cassette to lock the bent material to the cassette to form an enclosure. The sheet of material can be composed of plastic and molded having lines of reduced thickness which provide bending of the plastic along defined lines.

6 Claims, 4 Drawing Figures

FIG. 3

INVENTOR.
Nathan L. Solomon
BY
Howard C. Merkin
ATTORNEY

CASSETTE COVER

This invention relates generally to a packaging device, and more particularly to a foldable member which can be positioned around a magnetic tape cassette to provide a protective and versatile envelope for the tape cassette, and the tape contained therein.

Cassettes, as used today, are manufacture according to established quality and dimension standards, and practically all cassettes are essentially of the same size, work in the same way, and run at the same speed. Cassettes are so simple and durable that they find applications in a multitude of fields and areas. For example, tape cassettes are used by businessmen, educators, scientists, children, and the like, in many areas, such as novels for the blind, dictating machines, language and music courses, field sales communications, history and drama for school children, sophisticated computer applications, home entertainment, and the like.

Tape cassettes that are used today contain a window within which there appears an exposed section of tape; and two protrusions, one on either side of the cassette and adjacent to the edge having the window. The exposed section of tape is vulnerable to damage or total destruction, such as scratching of the surface, tearing of the tape, and the like; and the uneven side surfaces of the cassette present problems in handling, stacking, packing, storing, shipping, and the like.

It is an object of the present invention to provide an easily removable envelope for a tape cassette, which will protect the tape exposed in the window of the cassette from damage or destruction.

It is also an object of the present invention to provide an envelope for a tape cassette, which can function as a carrying case.

It is another object of the present invention to provide an envelope for a tape cassette, which can function as a mailing enclosure.

It is still another object of the present invention to provide an envelope for a tape cassette, which will permit the cassettes to be more easily stacked or packed.

It is an additional object of the present invention to provide an envelope for a tape cassette, which is reusable for a number of times.

It is yet another object of the present invention to provide an envelope for a tape cassette, which can be easily locked in position in surrounding relationship with the tape cassette.

It is also another object of the present invention to provide an envelope for a tape cassette, which is self-locking.

It is still another object of the present invention to provide an envelope for a tape cassette, which is economical to build and assemble, reliable in operation and easy to use.

These and further objects and advantages of the present invention are achieved, in general, through the use of a plastic member which fits around and locks to the tape cassette. The plastic member contains engaging means which, when positioned through the openings of the centers of the tape spools of the tape cassette and enter into engagement with each other, locks the plastic member in surrounding relationship with the cassette. The plastic member can also contain two recessed or open areas positioned to accommodate the two side protrusions of the cassette to provide flat sides for the cassette.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing wherein:

Similar reference numerals refer to similar parts throughout the several views of the drawing.

Figure 1:
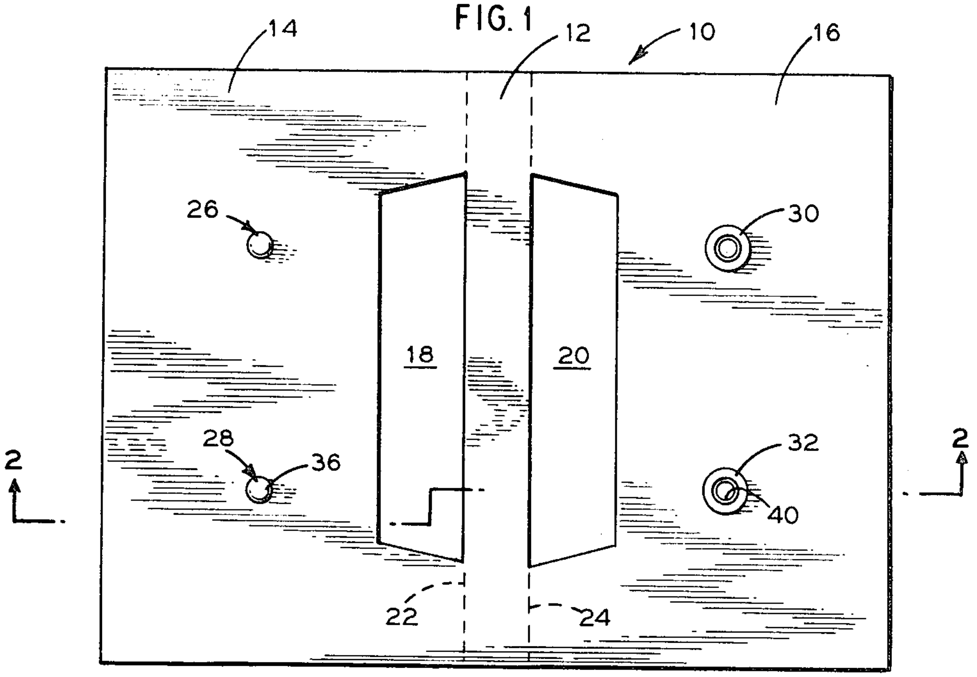
FIG. 1 is a top plan view of structure in accordance with the principles of this invention.
Figure 2:
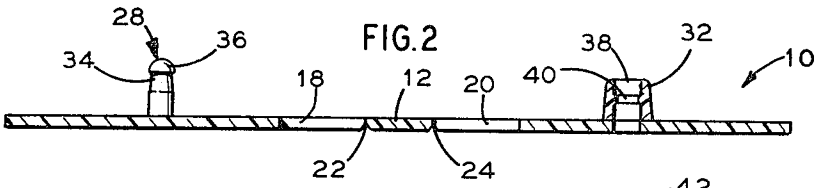
FIG. 2 is a view along the line 2—2 of FIG. 1.

Referring to FIG. 1, a sheet of plastic material 10 composed of a material which can be flexed or bent many times without breaking, such as polypropylene or polyethylene or the like, and which can be in the form of a flat sheet, supports three strips: a central web or front panel 12 positioned between two end members 14 and 16, which define bottom and top panels respectively. A cutout 18 is positioned within end member 14 adjacent to web 12, and another cutout 20 is positioned within end member 16 adjacent to web 12. As is evident by an examination of FIG. 2, the strip as shown can be molded, including injection molding.

The Web member 12 supports, along its edges where it joins with the end members, lines of reduced thickness 22 and 24. The lines of reduced thickness define self-hinges at the location of the fold lines when the sheet of plastic material is bent around a tape cassette.

The lines of reduced thickness can be in the form of a cut, which extends partially through the sheet of plastic material, the cut being on the outside of the bend, that side of the sheet of plastic material which is stressed in tension. The inside of the bend, that portion of the angle that is stressed in compression, does not require relief.

End members 14 and 16 support engaging means to lock the end members in position around the tape cassette, and can be of any convenient form, such as projections 26 and 28 positioned to be received and retained by receiving members 30 and 32, respectively.

In the embodiment of the engaging means illustrated, projections 26 and 28 are shaped to provide a reduced area 34, which is positioned back from an enlarged shaped end 36, and receiving members 30 and 32 contain a passageway 38 having a reduced area 40 slightly smaller than the enlarged shaped end 36. Projections 26 and 28 are positioned to be aligned with, and releasably engaged by receiving means 30 and 32 when end members 14 and 16 are bent along their lines of reduced thickness 22 and 24, to be parallel to each other and at substantially right angles to the central web 12.

The sheet of plastic material 10 and the engaging means can be composed of the same material, or of different material.

Figures 3, 4:
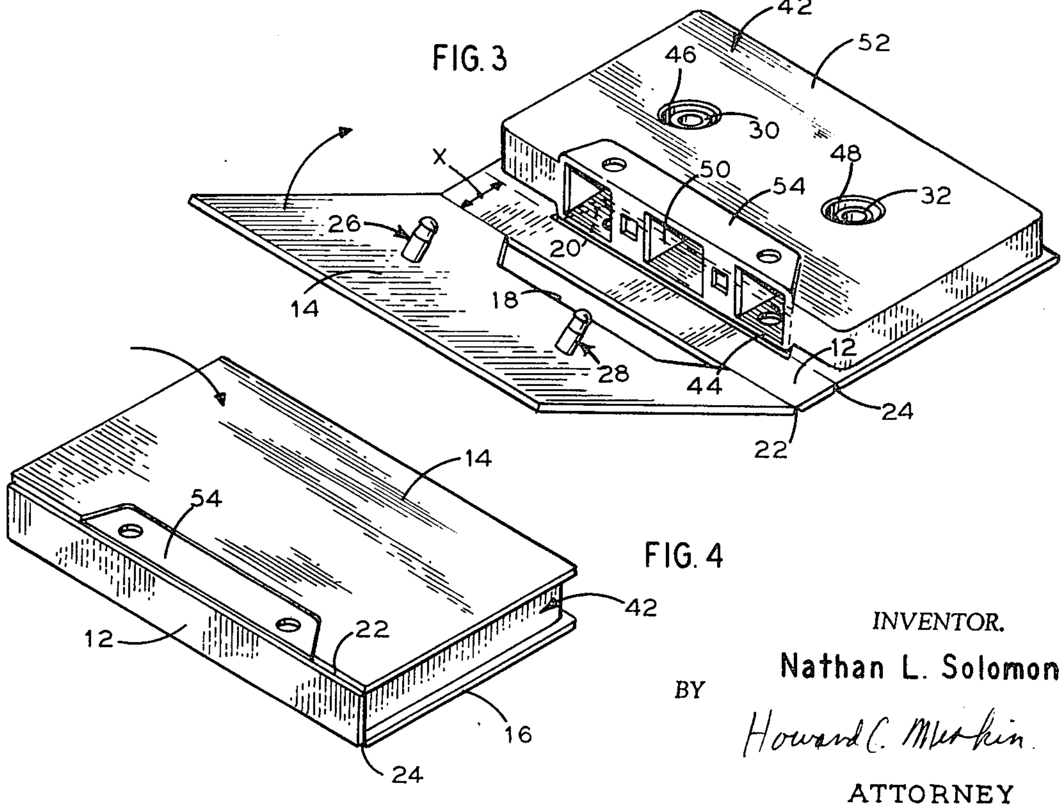
FIG. 3 is an isometric view illustrating the positioning of a protective envelope around a tape cassette in accordance with the principles of this invention.
FIG. 4 is an isometric view showing the envelope assembled on the cassette.

Referring now to FIG. 3, there is illustrated the positioning of a protective envelope around a tape cassette in accordance with the principles of this invention. The cassette is of conventional design and is not part of this invention. Tape cassette 42 is positioned flat on strip on end member 16, protrusion 44 of the cassette being positioned within cutout 20, and receiving members 30 and 32 being positioned within openings 46 and 48 of the centers of the tape spools of the cassette. The width "X" of central web 12 is substantially equal to the thickness "T" of the tape cassette. End member 14 is then urged toward the exposed side of the cassette, the sheet of plastic material 10 bending along the self-hinge defining lines of reduced thickness 22 and 24, the central web covering and forming a protective shield for the exposed tape in window 50, and end member 14 forming a covering for surface 52 of the tape cassette. Protrusion 54 of the cassette is positioned within cutout 18 of end member 14. Continued urging of the end members together forces enlarged shaped end 36 past reduced area 40 causing projections 26 and 28 to engage and be retained by receiving members 30 and 32, which in turn locks the sheet member 10 to the cassette.

To provide perfectly flat side surfaces, the sheet of plastic material 10 should be at least as thick as protrusions 44 and 54 of the cassette.

The sheet of plastic material can be shaped to provide an envelope that completely or more completely encloses the tape cassette, and the engaging means can be positioned elsewhere than through the centers of the tape spools of the cassette. Thus, sides may be positioned along the periphery of either end member 14 or 16, and made either foldable or at right angles to the surface of the end member.

Assembled as shown in FIG. 4, the cover formed by sheet 10, allows the cassette to be handled freely without fear of damage to the tape. The cover is securely held on the cassette and allows the unit to be mailed or shipped as is; the flat surface of the cover taking a label and stamps.

Obviously, many modifications and variations of the present invention are possible in the light of the above teaching. Various shapes for receiving and locking the projections can be used. It is, therefore, to be understood that the invention may be practiced otherwise than as specifically described herein.

What I claim is:

1. In combination with a tape cassette including top and bottom walls and a tape exposing windowed front wall, said cassette being provided with a longitudinally spaced opening in said top and bottom walls delineating longitudinally spaced vertical passageways through said cassette, and an enclosure for said cassette comprising top and bottom panels overlying said top and bottom walls respectively, a front panel overlying said cassette front wall and hinged along the top and bottom edges thereof to the front edges of said top and bottom panels respectively, and separable fastener pairs positioned on said top and bottom panels and each of said separable fasteners pairs projecting through a corresponding cassette passageway with the respective separable fasteners being in releasable engagement.

2. The combination of claim 1 wherein each of said fastener pairs includes a tubular female element provided with a restricted throat and a male element terminating in an enlarged head releasably engaging said restricted throat, each of said fastener elements projecting into a corresponding cassette passageway.

3. The combination of claim 1 wherein said enclosure panels and fastener elements are integrally formed of an organic polymeric resin.

4. The combination of claim 3 wherein said resin is polypropylene.

5. The combination of claim 1 wherein said enclosure panels are integrally formed with self-hinges joining the adjacent edges thereof.

6. The combination of claim 1 wherein said cassette is provided with sections projecting outwardly from said top and bottom walls proximate said end wall and said top and bottom panels having openings therein along the borders thereof proximate said front panel and registering with said projections.

* * * * *